Jan. 27, 1925.

C. P. THOMAS 1,524,323

BALANCING MACHINE

Filed Aug. 19, 1921    6 Sheets-Sheet 1

INVENTOR.
CHARLES P. THOMAS
BY
Raljmond A. Parker
ATTORNEY.

Jan. 27, 1925.

C. P. THOMAS 1,524,323

BALANCING MACHINE

Filed Aug. 19, 1921

INVENTOR.
CHARLES P. THOMAS
BY Ralzemond A. Parker
ATTORNEY.

Jan. 27, 1925.

C. P. THOMAS 1,524,323

BALANCING MACHINE

Filed Aug. 19, 1921

INVENTOR.
CHARLES P. THOMAS
BY Ralzemond A. Parker
ATTORNEY.

Patented Jan. 27, 1925.

1,524,323

UNITED STATES PATENT OFFICE.

CHARLES P. THOMAS, OF LANSING, MICHIGAN.

BALANCING MACHINE.

Application filed August 19, 1921. Serial No. 493,748.

*To all whom it may concern:*

Be it known that I, CHARLES P. THOMAS, citizen of the United States, residing at Lansing, county of Ingham, State of Michigan, have invented a certain new and useful Improvement in Balancing Machines, and declare the following to be a full, clear, and exact description of the same, such as will enable others skilled in the art to which it pertains to make and use the same, reference being had to the accompanying drawings, which form a part of this specification.

My invention relates to improvements in machines for indicating the unbalance in rotating parts as to the unsymmetrical location of material around the axis of said part and longitudinally thereof, that is to say, for indicating "static" and "dynamic" unbalance; and objects of my improvements are to adapt such a machine to be operated by a single attendant and to secure greater speed and efficiency of operation.

$a$ $a^2$ are pedestals or fixed supporting parts of the machine and $b$ is a frame work supported upon the pedestals $a$ $a^2$ alternatively to respond to the static or dynamic unbalance of the part being tested which is supported and rotated upon said frame.

Figure 12:
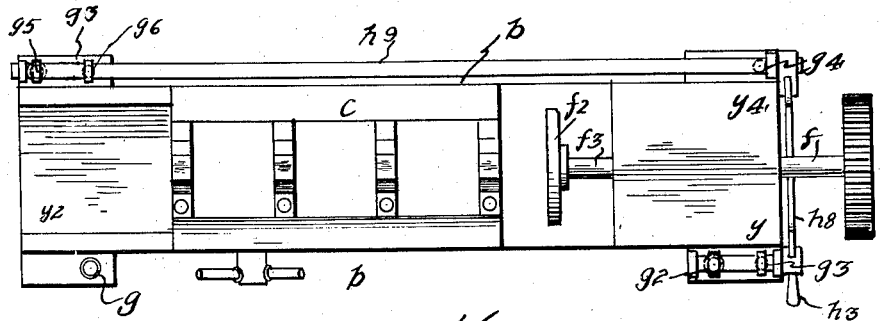
Fig. 12 is a plan view of the machine, many of the operative parts being removed so as to indicate the method and apparatus for supporting the movable frame.

For convenience of description, I have indicated the four corners of the frame $b$ in Fig. 12 by the reference characters $y$, $y^2$ $y^3$ and $y^4$. The corner $y^2$ is supported upon a bracket at the pedestal $a^2$ by a spring $g$. The corner $y^4$ is supported by a rigid pin $g^4$ upon the pedestal $a$. The corner $y$ may be supported upon the pedestal $a$ either by a rigid pin $g^3$ or by a spring $g^2$ and the corner $y^3$ may be supported upon the pedestal $a^2$ by a rigid pin $g^3$ or by a spring $g^5$.

Figure 8:
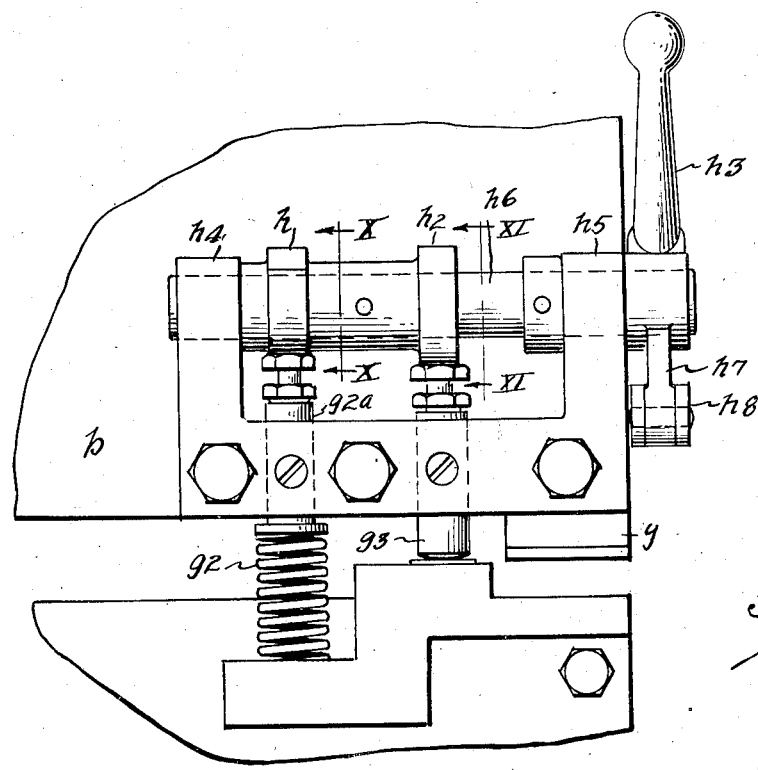
Fig. 8 is an enlarged detail view of the parts shown adjacent to the lower right hand corner of the vehicle frame-work in Fig. 1.
Figure 9:
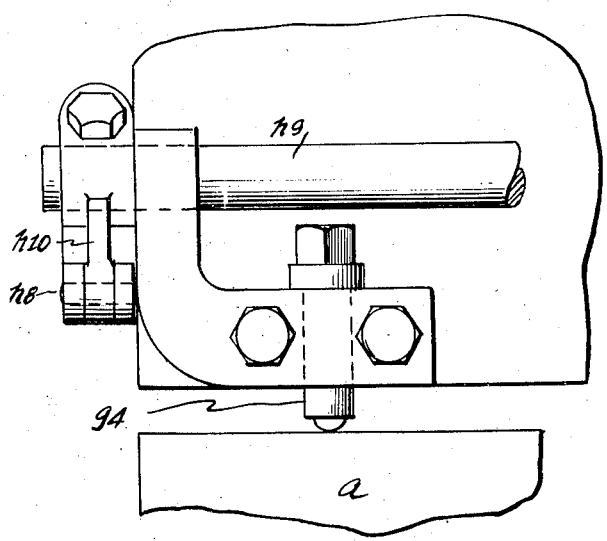
Fig. 9 is a view of the parts at the corner of said movable frame transversely opposite the corner shown in Fig. 8.
Figure 10:
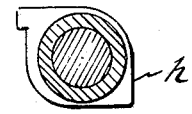
Figs. 10 and 11 are detail sectional views on the lines X—X and XI—XI of Fig. 8.
Figure 11:

The apparatus by which the parts may be adjusted to afford a rigid or elastic support to the corner $y$ is described as follows:

There is a shaft $h^6$ resting in bearings $h^4$, $h^5$ which bearings are rigid upon the frame $b$. The shaft $h^6$ is provided with cams $h$ and $h^2$ (Figs. 8, 10, 11) and beneath these cams are rods $g^3$ and $g^2a$ adapted to reciprocate vertically in apertures the walls of which are rigid with frame $b$. $h^3$ is a lever arm or handle which may be manipulated to oscillate the shaft $h^6$. As shown in Figs. 10 and 11, the cams $h$ and $h^2$ are so shaped and arranged upon the shaft $h^6$ that when one is in position to thrust its corresponding rod $g^3$ or $g^2a$ downward the other is in position to permit its corresponding pin to rise to the upper end of its travel. When the lever arm $h^3$ is turned in one direction, the rod or pin $g^3$ is forced downward by its cam $h^2$ and engages against the prepared surface rigidly secured to the pedestal $a$ so that the corner $y$ of the frame $b$ is then supported pivotally rigidly upon said pedestal. When the lever arm $h^3$ is turned in the other direction the cam $h^2$ is withdrawn from the rod $g^3$ and the rod or pin $g^2a$ is thrust forward thus supporting the corner $y$ of the frame $b$ upon the spring $g^2$.

Figure 1:
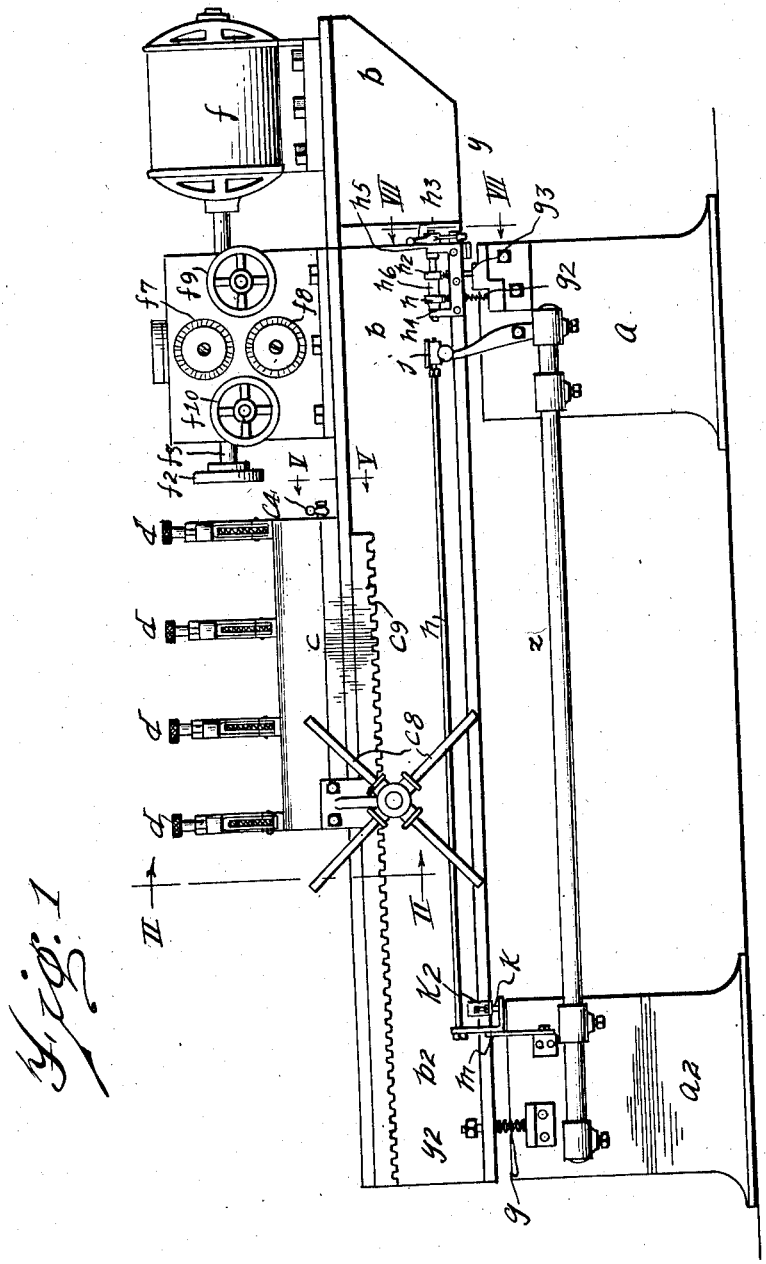
Figure 1 is an elevation of a machine embodying my invention.
Figure 7:
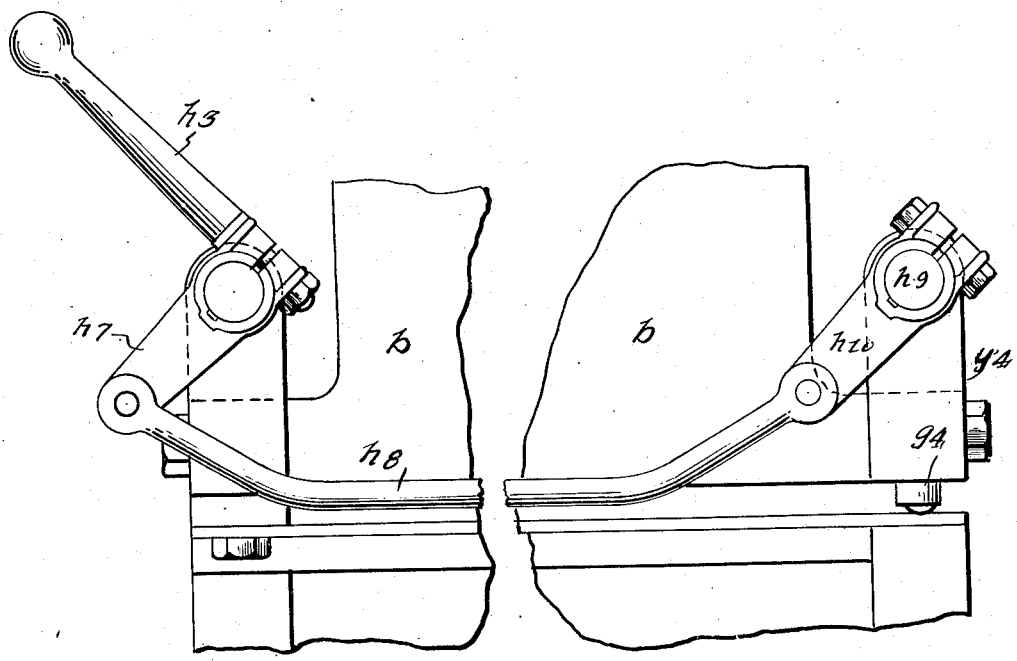
Fig. 7 is a detail view in elevation of the parts adjacent to the line VII—VII Fig. 1.

The corner $y^3$ of the frame $b$ is provided with an apparatus entirely similar to that just described for alternatively supporting the corner $y$ and its operating shaft $h^9$ (Fig. 7) extends clear across the back of the machine as shown in Fig. 1 and is connected to be operated simultaneously with the operation of the shaft $h^6$ by means of a lever arm $h^{10}$ joined by a connecting rod $h^8$ to a lever arm $h^7$ rigidly connected with the shaft $h^6$. By this arrangement when the corner $y$ is adjusted for elastic support, the corner $y^3$ is adjusted for a rigid pivotal support and when the corner $y$ is adjusted for a rigid pivotal support the corner $y^3$ is adjusted for an elastic support.

The work or object to be tested is placed upon the frame $b$ and rotated thereon with its axis parallel to the longitudinal center line of said frame. Now if the lever arm or handle $h^3$ is operated to afford an elastic support for the corner $y$ of said frame, the parts at the corner $y^3$ will be adjusted to afford a rigid support and the corner $y^4$ is always supported pivotally and rigidly, therefore, the frame $b$ will respond to static unbalance or to the unbalance centrifugal force due to the unsymmetrical location of the material around the axis of the work.

If the parts at the corner $y$ are adjusted to afford a rigid support to said corner the parts at the corner $y^3$ will be adjusted to afford an elastic support and the frame $b$ will, therefore, respond to any moment due to the unsymmetrical location of the material along the axis of the rotating part.

Figure 13:
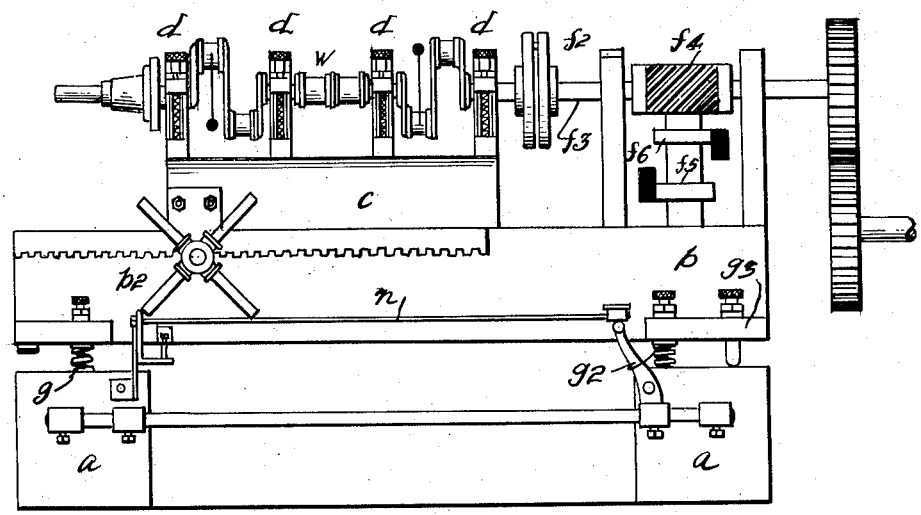
Fig. 13 is a side elevation largely in diagram indicating the position of the body being operated upon and its relative position to the constituent parts of the machine.

In Fig. 13, the location of the vertical counter-balance shaft $f^5$ is indicated as well as the eccentric weights $f^6$ on said shaft by which balancing counter effects are produced to correspond with the unbalance of the work or part being operated upon. The position of these weights is adjusted by handles $f^9$ $f^{10}$ (Fig. 1) and such adjustment is indicated upon scales $f^7$ $f^8$. $f$ is an electric motor secured upon the frame $b$ which actuates a shaft $f^3$ through suitable connections upon which shaft is a head $f^2$ to which the work (in this instance an engine shaft is contemplated) is flexibly connected so that it shall be rotated thereby.

The operator stands in front of the machine as shown in Fig. 1 adjacent to the pedestal $a$. The engine shaft or other object to be indicated having been mounted in position, the operator sets the electric motor $f$ in motion and regulates the motion until the point of synchronism between the work and the frame $b$ is reached. The frame $b$ is first adjusted to indicate static unbalance and the operator then adjusts the weights $f^6$ until this unbalance effect is counteracted. The amount of the static unbalance is indicated by the position of the weights $f^6$. The frame $b$ is then adjusted as above described to indicate only unbalance moments or dynamic unbalance and the operator then adjusts the weights $f^6$ to counteract the dynamic unbalance and this adjustment of the weight then indicates this latter effect.

To which ever condition the frame $b$ is adjusted to respond, whether to static or dynamic unbalance, the corner $y^2$ of said frame will oscillate to indicate the unbalance effect. I, therefore, provide an indicator for the movement of the corner $y^2$ which in this case consists of a bell crank lever $k$ pivotally supported by a bracket $m$ on the pedestal $a^2$ and having a contact pin rigidly secured to the frame $b$ engaging one of its arms. The other arm of the bell crank lever $k$ is operatively secured to one end of a connecting rod $n$ which latter is carried over to a position adjacent to that at which the operator stands and is there connected with an indicator of convenient construction consisting of a pivoted needle which the movement of the rod $n$ causes to vibrate over a scale. The indicator being of conventional construction is not specifically described. By observing the oscillation of the needle of the indicator $j$ the operator can tell whether the work is in synchronism with the frame $b$ and whether the various unbalance effects have been compensated.

I have observed that the indications are sometimes rendered unreliable by the nature or condition of the bearing for the shaft or object being tested in that the shaft may be strained into an abnormal shape longitudinally thereof by said bearings or the condition of an extended bearing surface may produce a fallacious indication of unbalance. I have therefore provided a unitary and rigid support for the multiple bearings so that said bearings are constructed, shaped and relatively located once for all. The upper portion of each of said bearings is held yieldingly in place. I have also replaced the extended bearing surface of said bearings by rollers.

Figure 3:
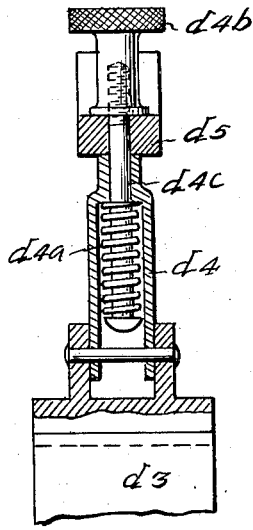
Fig. 3 is a detail section on the line III—III Fig. 2.
Figure 4:
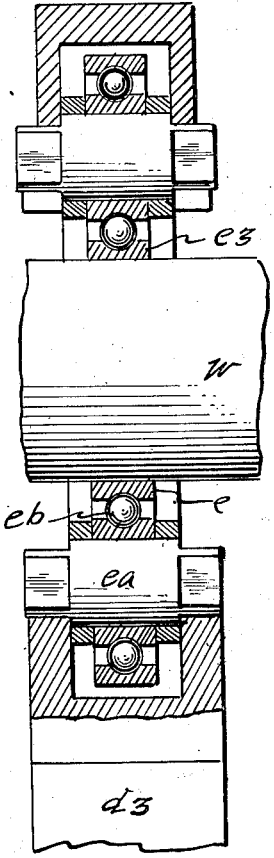
Fig. 4 is a detail section on the line IV—IV Fig. 2.
Figure 5:
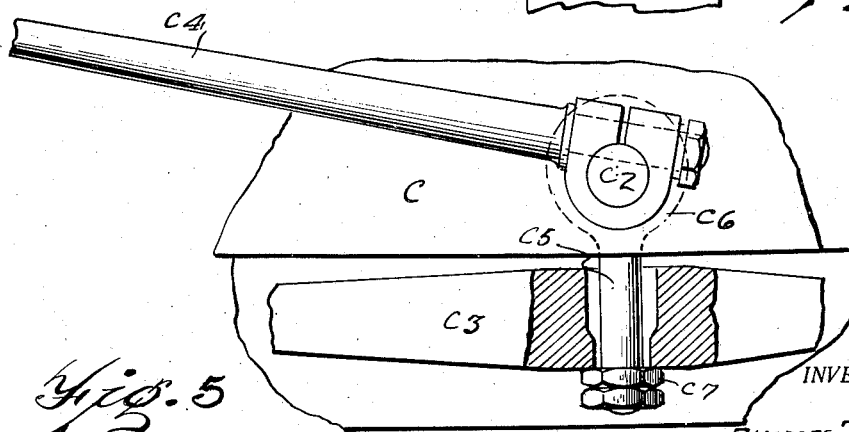
Fig. 5 is a detail view in elevation of the parts adjacent to the line V—V Fig. 1.
Figure 6:
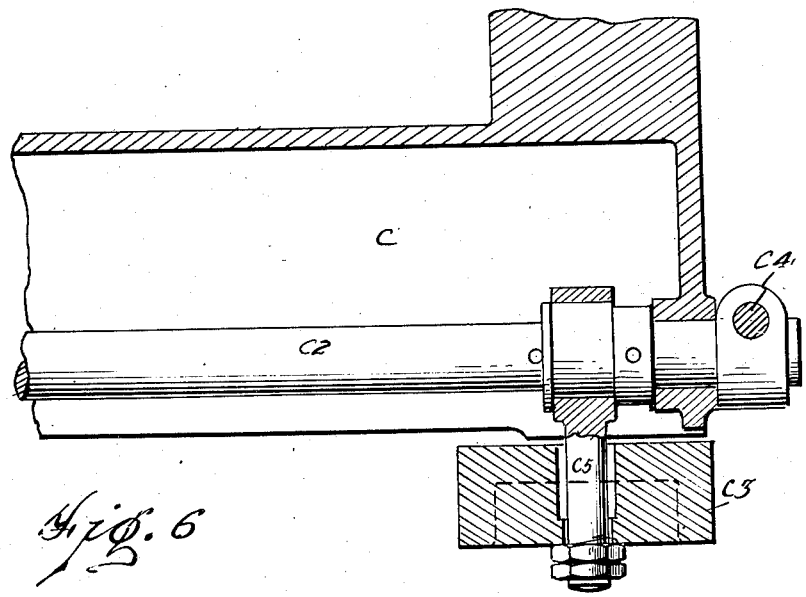
Fig. 6 is a detail sectional view on the line VI—VI of Fig. 2.

The construction of the part for supporting the shaft or work is as follows:

$c$ is a rigid cross head engaging longitudinal ways $c^{10}$ at the sides and top of the frame $b$ and adapted to slide thereon. $c^8$ indicate handles adapted to turn a pinion bearing in a hanger from the cross head $c$ which pinion engages in a stationary rack $c^9$ upon the frame $b$. By turning said pinion the position of the cross head $c$ may be adjusted. When adjusted to its required position the cross head $c$ is bound firmly in place by turning a shaft $c^2$ by means of a handle $c^4$ to draw upward upon pitmans $c^5$ engaging clamping bars $c^3$ which latter engage under a portion of the frame $b$. $d$ $d$ $d$ $d$ are bearings supported upon the cross head $c$. The construction of said bearings is specifically illustrated in Figs. 2, 3 and 4 in which $d^3$ represents a cross bar rigidly supported on the top of the cross head $c$ and in this cross head are secured supports $ea$ or ball bearings $eb$ upon which cylindrical rollers $e$ $e^2$ are adapted to turn. The peripheral surface of these rollers are neatly and smoothly finished. $d^2$ and $d^4$ are vertical rods pivoted at the ends of the cross piece $d^3$ and rising therefrom. $d^5$ is a cross piece opposite and similar to $d^3$ having one end pivoted to the upper end of the vertical rod $d^2$ and the other end engaged by the rod $d^4$. The rod $d^4$ (Fig. 3) is provided at its upper end with a milled nut $d^4b$ engaging a rod $d^4c$ which rod extends through an axial aperture in the rod $d^4$ and engages the lower end of a compression spring $d^4a$, the upper end of which spring engages a shoulder on the rod $d^4$. The nut $d^4b$ engages against the upper surface of the cross bar $d^5$ with a yielding pressure.

Figure 2:
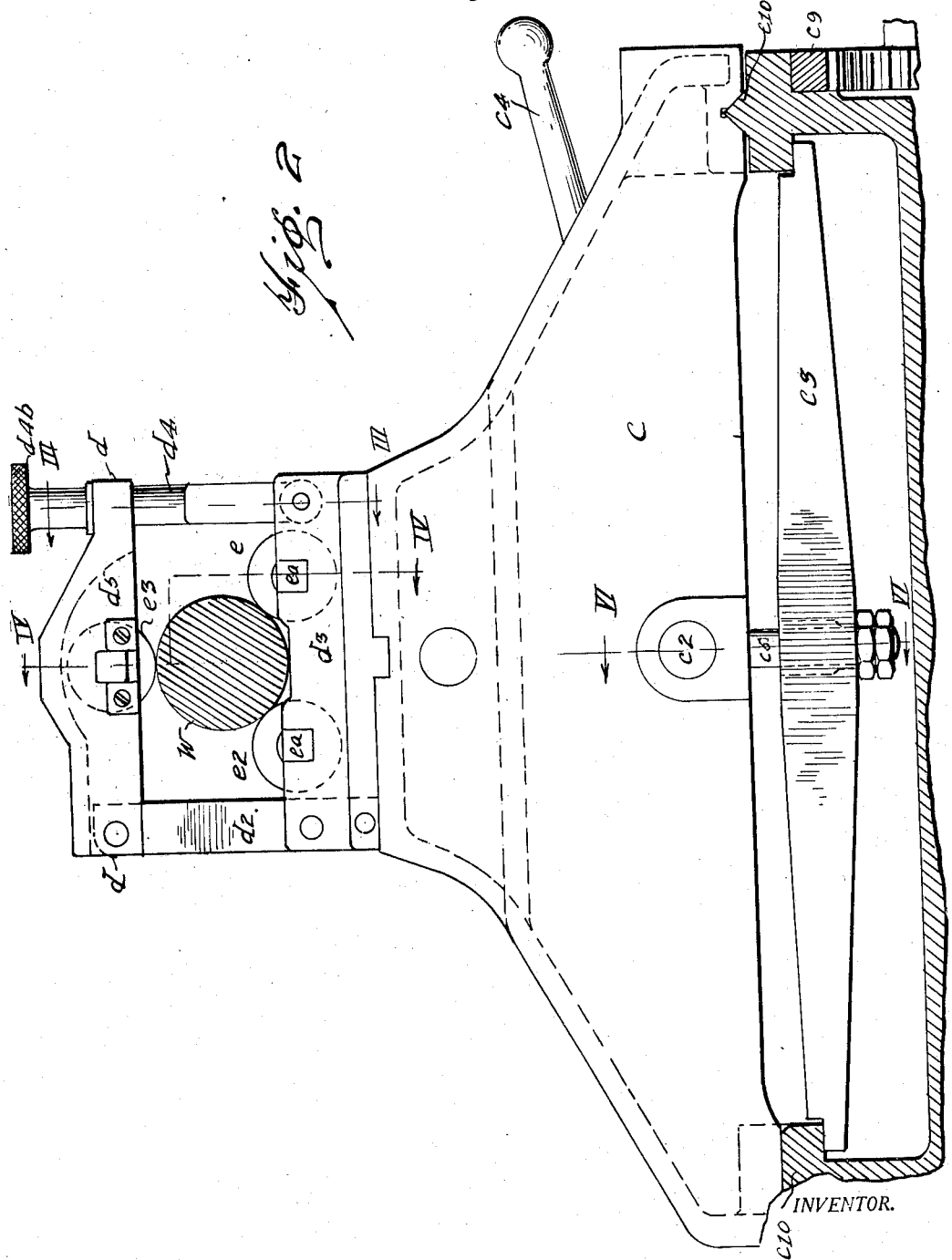
Fig. 2 is a detail section on the line II—II Fig. 1.

$e^3$ is a cylindrical roller similar to $e$ and $e^2$ located at the center of the cross piece $d^5$ and supported therein in the same way that the rollers $e$ $e^2$ are supported in the cross piece $d^3$. The shaft $w$ is placed upon the rollers $e$ $e^2$ as shown in Fig. 2 and the cross piece $d^5$ is turned downward to bring the roller $e^3$ against the upper surface of said shaft. The nut $d^4b$ is then manipulated to adjust the tension of the roller $e^3$ upon the work $w$.

With the above described construction, if the shaft is at all crooked, this fact will be indicated by the rattling of a bearing as the shaft is rotated and the contact surfaces are small and accurately formed so that they hold the shaft accurately and firmly in its proper position. I have found that this construction obviates the difficulties due to the bearings above pointed out.

As hitherto constructed it has been necessary to adjust the bearings separately at the corners $y$ and $y^3$ and to observe the indication of the frame $b$ at the corner $y^2$, while the various parts are adjusted from a position adjacent to the corner $y$, this has required an attendant, or assistant, to the main operator, or has required the operator to leave his position to attend to matters at separate points. The bearings for the shaft have been separate and separately adjustable and have been liable to produce false indications as above pointed out. By the above described construction these disadvantages have been obviated. The speed of the machine has been increased many times and it has been rendered capable of operation by a single skilled operator which has been productive of more satisfactory results in itself.

$z$, (Fig. 1), is a spacing rod extending between the pedestals, $a$, $a^3$.

Claims:
1. In an apparatus of the kind described, a frame, apparatus for alternatively affording a rigid pivotal support or an elastic support to one corner of said frame, a similar apparatus at another corner of said frame and means for adjusting both of said apparatus from a single point.

2. In an apparatus of the kind described, a frame, apparatus for alternatively affording a rigid pivotal support or an elastic support to one corner of said frame, a similar apparatus at another corner of said frame, said apparatus being connected so that the adjustment of one shall cause the adjustment of the other.

3. In an apparatus of the kind described, a frame, apparatus for alternatively affording a rigid pivotal support or an elastic support to one corner of said frame, a similar apparatus at another corner of said frame, each of said apparatus being provided with a shaft having cams thereon adapted to throw the elastic support or the pivotal rigid support into operation, said shafts being joined by a connecting rod at eccentric points relative to said shafts.

4. In an apparatus of the kind described, a movable frame, a support adjustable to an elastic or rigid-pivotal condition for one corner of said frame, a similar adjustable support for another corner of said frame, means whereby said supports may be adjusted from one position and means whereby the motion of said frame at a distant point is indicated adjacent to the point from which said bearings are adjusted.

5. In an apparatus of the kind described, a movable frame, a support adjustable to an elastic or rigid-pivotal condition for one corner of said frame, a similar adjustable support for another corner of said frame, means whereby said supports may be adjusted from one position and means whereby the motion of said frame at a distant point is indicated adjacent to the point from which said bearings are adjusted and means for adjusting the compensating effect for the unbalance work and observing said adjustment adjacent to the point at which said bearings are adjusted.

In testimony whereof, I, sign this specification.

CHARLES P. THOMAS.